United States Patent
Mackenzie et al.

(10) Patent No.: US 11,432,280 B2
(45) Date of Patent: Aug. 30, 2022

(54) RESOURCE ALLOCATION METHOD AND APPARATUS

(71) Applicant: British Telecommunications Public Limited Company, London (GB)

(72) Inventors: Richard Mackenzie, London (GB); Yang Yang, Beijing (CN); Mo Hao, Beijing (CN)

(73) Assignee: British Telecommunications Public Limited Company, London (GB)

( * ) Notice: Subject to any disclaimer, the term of this patent is extended or adjusted under 35 U.S.C. 154(b) by 540 days.

(21) Appl. No.: 16/336,304

(22) PCT Filed: Sep. 22, 2017

(86) PCT No.: PCT/EP2017/074083
§ 371 (c)(1),
(2) Date: Mar. 25, 2019

(87) PCT Pub. No.: WO2018/060099
PCT Pub. Date: Apr. 5, 2018

(65) Prior Publication Data
US 2019/0215829 A1    Jul. 11, 2019

(30) Foreign Application Priority Data

Sep. 30, 2016 (CN) .......................... 201610875313.0

(51) Int. Cl.
*H04W 72/04* (2009.01)
*H04W 72/08* (2009.01)
(Continued)

(52) U.S. Cl.
CPC ....... *H04W 72/0426* (2013.01); *H04W 16/12* (2013.01); *H04W 16/18* (2013.01);
(Continued)

(58) Field of Classification Search
CPC . H04W 72/0426; H04W 16/12; H04W 16/18; H04W 16/32; H04W 28/16; H04W 72/082
See application file for complete search history.

(56) References Cited

U.S. PATENT DOCUMENTS 10,182,352 B2    1/2019 Saffre et al.
2008/0014954 A1    1/2008 Matsumoto et al.
(Continued)

FOREIGN PATENT DOCUMENTS

CN    101873602 A    10/2010
CN    102006599 A    4/2011
(Continued)

OTHER PUBLICATIONS

Communication pursuant to Article 94(3) EPC For EP Application No. 17772398.8, dated Jul. 20, 2020, 5 pages.
(Continued)

*Primary Examiner* — Huy D Vu
*Assistant Examiner* — Bailor C. Hsu
(74) *Attorney, Agent, or Firm* — Patterson Thuente IP (57) ABSTRACT

Embodiments of the present disclosure provide a resource allocation method and apparatus for a small cell cluster and a communications system. The resource allocation method includes: exchanging by the base station of the upper level with another base station of the upper level, to obtain information on resources and/or interference of the other base station of the upper level; receiving information by the base station of the upper level at least from the cluster head of the SCC, to obtain information on resources and/or interference of the base station of the upper level; and allocating resources for the small cell cluster by the base station of the upper level based on the obtained information on resources and/or interference of the other base station of
(Continued)

the upper level and the information on resources and/or interference of the base station of the upper level. According to the embodiments, interference coordination may be performed efficiently on a small cell cluster at an edge of the base station of the higher lever, so as to lower the interference to the small cell cluster, and the expandability of the network may be improved.

12 Claims, 4 Drawing Sheets

(51) Int. Cl.
    *H04W 16/12*     (2009.01)
    *H04W 16/18*     (2009.01)
    *H04W 28/16*     (2009.01)
    *H04W 16/32*     (2009.01)

(52) U.S. Cl.
    CPC ........... *H04W 16/32* (2013.01); *H04W 28/16* (2013.01); *H04W 72/082* (2013.01)

(56) References Cited

U.S. PATENT DOCUMENTS

| | | |
|---|---|---|
| 2009/0310545 A1 | 12/2009 | Tateson et al. |
| 2010/0111021 A1* | 5/2010 | Hui ................... H04W 72/0486 370/329 |
| 2010/0142454 A1 | 6/2010 | Chang |
| 2010/0172754 A1 | 7/2010 | Flanagan |
| 2011/0105138 A1 | 5/2011 | Morimoto et al. |
| 2011/0274009 A1 | 11/2011 | Cooper |
| 2011/0274101 A1 | 11/2011 | Cooper |
| 2011/0294514 A1 | 12/2011 | Kulkarni |
| 2013/0121191 A1 | 5/2013 | Song et al. |
| 2013/0210447 A1 | 8/2013 | Moe et al. |
| 2013/0322235 A1* | 12/2013 | Khoryaev ............. H04W 36/20 370/229 |
| 2014/0128088 A1 | 5/2014 | Farhadi |
| 2014/0198659 A1 | 7/2014 | Vargas Bautista et al. |
| 2014/0226541 A1* | 8/2014 | Xu .................... H04W 72/0446 370/336 |
| 2014/0235259 A1 | 8/2014 | Salami et al. |
| 2015/0043390 A1 | 2/2015 | Wang et al. |
| 2015/0078303 A1* | 3/2015 | Jongren .............. H04W 52/243 370/329 |
| 2015/0085677 A1* | 3/2015 | Pourahmadi .......... H04L 5/0092 370/252 |
| 2015/0092627 A1 | 4/2015 | Liu |
| 2015/0117327 A1* | 4/2015 | Nordstrom .......... H04W 72/082 370/329 |
| 2015/0119057 A1 | 4/2015 | Fujito |
| 2015/0133129 A1* | 5/2015 | Chiang ................. H04W 16/10 455/447 |
| 2015/0173011 A1* | 6/2015 | Das ....................... H04W 24/02 370/328 |
| 2015/0215879 A1 | 7/2015 | Zhu et al. |
| 2015/0365941 A1 | 12/2015 | Liu et al. |
| 2015/0373550 A1* | 12/2015 | Hong ....................... H04L 5/001 370/254 |
| 2016/0007361 A1 | 1/2016 | Andersson et al. |
| 2016/0037523 A1 | 2/2016 | Wei et al. |
| 2016/0056907 A1 | 2/2016 | Wei |
| 2016/0112177 A1* | 4/2016 | Zheng ................. H04W 72/082 370/330 |
| 2016/0278100 A1 | 9/2016 | Sawai |
| 2016/0360538 A1* | 12/2016 | Jwa ....................... H04L 5/0048 |
| 2016/0374119 A1* | 12/2016 | Choi ..................... H04W 16/32 |
| 2017/0099617 A1 | 4/2017 | Tomici |
| 2017/0265068 A1* | 9/2017 | Cui ....................... H04W 48/16 |
| 2018/0242392 A1 | 8/2018 | Liu |
| 2019/0223024 A1 | 7/2019 | MacKenzie et al. |
| 2019/0246284 A1 | 8/2019 | MacKenzie et al. |

FOREIGN PATENT DOCUMENTS

| | | |
|---|---|---|
| CN | 102131200 A | 7/2011 |
| CN | 102186174 A | 9/2011 |
| CN | 103338453 A | 10/2013 |
| CN | 103379498 A | 10/2013 |
| CN | 103442369 A | 12/2013 |
| CN | 104105174 A | 10/2014 |
| CN | 104159258 A | 11/2014 |
| CN | 104254081 A | 12/2014 |
| CN | 104918256 A | 9/2015 |
| CN | 104955077 A | 9/2015 |
| CN | 105101227 A | 11/2015 |
| CN | 105120467 A | 12/2015 |
| CN | 103442369 B | 4/2016 |
| CN | 105636066 A | 6/2016 |
| CN | 105813212 A | 7/2016 |
| CN | 104159258 B | 3/2018 |
| CN | 104254081 B | 5/2018 |
| EP | 2 779 728 A1 | 9/2014 |
| EP | 2 822 340 A1 | 1/2015 |
| EP | 2822340 B1 | 9/2016 |
| WO | WO 2012/139653 A1 | 10/2012 |
| WO | WO-2012159270 A1 | 11/2012 |
| WO | WO 2013/015255 A1 | 1/2013 |
| WO | WO 2013/075340 A1 | 5/2013 |
| WO | WO 2014/012192 A1 | 1/2014 |
| WO | WO-2014035415 A1 | 3/2014 |
| WO | WO-2014113941 A1 | 7/2014 |
| WO | WO 2014/179967 A1 | 11/2014 |

OTHER PUBLICATIONS

Communication pursuant to Article 94(3) EPC for EP Application No. 17777543.4, dated Dec. 10, 2020, 9 pages.
Communication pursuant to Article 94(3) EPC For EP Application No. 17780039.8, dated Dec. 11, 2020, 9 pages.
Extended European Search Report for Application No. EP14275174.2, dated Apr. 9, 2015, 7 pages.
U.S. Appl. No. 16/336,304, filed Mar. 25, 2019, Inventor(s): Makenzie et al.
Written Opinion of the International Preliminary Examining Authority for Application No. PCT/EP2015/067278, dated Jul. 25, 2016, 5 pages.
International Search Report and Written Opinion for corresponding PCT Application No. PCT/EP2017/074059, dated Nov. 29, 2017, 9 pages.
International Search Report and Written Opinion for corresponding PCT Application No. PCTEP2017/074083, dated Dec. 18, 2017, 14 pages.
International Search Report and Written Opinion for corresponding International Application No. PCT/EP2017/074132 dated Dec. 6, 2017; 12 pages.
International Preliminary Report on Patentability for corresponding International Application No. PCT/EP2015/067278 dated Oct. 12, 2016; 15 pages.
U.S. Appl. No. 16/336,256, filed Mar. 25, 2019, Inventor(s): MacKenzie et al.
U.S. Appl. No. 16/336,325, filed Mar. 25, 2019, Inventor(s): MacKenzie et al.
Application and Filing Receipt for U.S. Appl. No. 15/503,567, filed Feb. 13, 2017, Inventor(s): Saffre et al.
Hatoum et al., "FCRA: Femtocell Cluster-based Resource Allocation Scheme for OFDMA Networks"; ICC 2011—2011 IEEE International Conference on Communications—Jun. 5-9, 2011—Kyoto, Japan, IEEE, Piscataway, NJ, USA, pp. 1-6, XP031908466, DOI: 10.1109/ICC.2011.5962705, ISBN: 978-1-61284-232-5; 6 pages total.
Fan Song et al: "A Clustering-Based Downlink Resource Allocation Algorithm for Small Cell Networks", 2015 International Conference on Wireless Communications & Signal Processing (WCSP), IEEE, Oct. 15, 2015 (Oct. 15, 2015), pp. 1-5, XP832828554, DOI: 10. 1109/WCS p. 2015. 7341194, 5 pages total.

(56) References Cited

OTHER PUBLICATIONS

Potevio: "Consideration on the Informing of Carrier Pattern in Carrier Based HetNet ICIC", 3GPP Draft; R3-112546, 3rd Generation Partnership Project (3GPP), Mobile Competence Centre ; 650, Route Des Lucioles ; F-06921 Sophia-Antipolis Cedex; France, vol. RAN WG3, No. Zhuhai; Oct. 10, 2011, Sep. 30, 2011 (Sep. 30, 2011), XP050542189 2 pages total.

Zubin Bharucha et al: "Dynamic Resource Partitioning for Downlink Femto-to-Macro-Cell Interference Avoidance", Eurasip Journal on Wireless Communications and Networking,vol. 8, No. 7, Jan. 1, 2010 (Jan. 1, 2010), p. 3498, XP055123525, ISSN: 1687-1499, DOI: 10.1155/2010/143413, 12 pages total.

Potevio: "Consideration of carrier pattern design for carrier based EICIC", 3GPP Draft; R3-112063, 3rd Generation Partnership Project (3GPP), Mobile Competence Centre; 650, Route Des Lucioles ; F-06921 Sophia-Antipolis Cedex, France, vol. RAN WG3, No. Athens, Greece; Aug. 22, 2011, Sep. 9, 2011 (Sep. 9, 2011), XP050541692, 3 pages total.

Ericsson: "DL Interference enhancements for Carrier-based HetNet ICIC", 3GPP Draft; R3-120728-DL-Interference, $3^{rd}$ Generation Partnership Project (3GPP), Mobile Competence Centre; 650, Route Des Lucioles ; F-06921 Sophia-Antipolis Cedex, France, vol. RAN WG3, No. Cabo; Mar. 26, 2012-Mar. 30, 2012, Apr. 2, 2012 (Apr. 2, 2012), XP050669079, Retrieved from the Internet: URL:http://www.3gpp.org/ftp/tsg ran/WG3Iu/TSGR375bisjDocsj, 3 pages total.

Laselva et al., "Self-Optimisation," LTE Self-Organising Networks (SON) Network Management Automation for Operational Efficiency, First Edition (2012) John Wiley & Sons, Ltd; p. 135-234, 100 pages total.

Liang et al., "Resource allocation with interference avoidance in OFDMA femotcell networks," IEEE Transactions on Vehicular Technology (2012) vol. 61, No. 5; p. 2243-2255, 13 pages total.

Shahid et al., "A decentralized heuristic approach towards resource allocation in femtocell networks," Entropy (2013) 15; p. 2524-2547, 24 pages total.

International Preliminary Report on Patentability, Application No. PCT/EP2017/074059, dated Apr. 11, 2019, 8 pages.

International Preliminary Report on Patentability, for corresponding PCT Application No. PCTEP2017/074083, dated Apr. 11, 2019, 11 pages.

International Preliminary Report on Patentability, for corresponding PCT Application No. PCTEP2017/074132, dated Apr. 2, 2019, 9 pages.

International Search Report and Written Opinion for corresponding International Application No. PCT/EP2015/067278 dated Oct. 5, 2016; 14 pages.

Broadcom Corporation "Interference Management for Small Cell Enhancements," 3GPP TSG RAN WG1 Meeting #72bis, R1-131474, Apr. 15-19, 2013, 4 pages.

Office Action for Chinese Application No. 201610874455.5, dated May 21, 2021, 11 pages.

Office Action for Chinese Application No. 201610875313.0, dated May 24, 2021, 14 pages.

Office Action for Chinese Application No. 201610875596.9, dated May 7, 2021, 11 pages.

\* cited by examiner

RESOURCE ALLOCATION METHOD AND APPARATUS

CROSS-REFERENCE TO RELATED APPLICATION

The present application claims priority to International Application No. PCT/EP2017/074083 filed Sep. 22, 2017, and Chinese Application No.: 201610875313.0 filed Sep. 30, 2016 which is hereby incorporated herein in its entirety by reference.

TECHNICAL FIELD

The present disclosure relates to the field of telecommunications, and in particular to a resource allocation method and apparatus for a small cell cluster and a telecommunications system.

BACKGROUND

Ultra-Dense Networks (UDNs) are able to permit more spectral reuse, so as to obtain larger communication capacities, hence, they are deemed as a key technology for future radio communications systems.

In a UDN, multiple small cells (SCs) may be configured in a cellular network so as to improve communication capacity. In each small cell, signals may be transmitted between a small cell station and user equipment relatively close to each other. However, as the small cells are densely deployed, the small cells may produce harmful interference to other user equipment in similar spectral range. The problem is more severe when a small cell is at an edge of a macro cell range if both of them use identical frequency resources.

Many technologies are known for dealing with interference coordination of a cellular network. For example, a COordinated MultiPoint (COMP) technology is capable of enhancing performance of cell-edge user equipment; and in an Inter-Cell Interference Coordination (ICIC) technology, uplink and downlink resource usage is reported to neighboring cells; wherein, Relative Narrowband Transmit Power (RNTP) may be used to indicate uplink and downlink resource usage, and a High Interference Indicator (HII) may be used to indicate uplink resource usage. Furthermore, the uplink may report interference experienced by the uplink via an uplink Overload Indicator (OI).

However, these interference coordination technologies for a cellular network are either unable to obtain a sufficient interference alleviation effect, or unable to possess scalability needed by a UDN.

For example, in the coordinated multipoint technology, a large quantity of information on user equipment is shared between multiple base stations, and for user equipment having no ideal backhaul, sufficient interference coordination is not optimal. As part of ICIC technology, information is transmitted via an X2 interface, and each cell makes a policy independently. If information is shared between a large quantity of cells in the UDN in the same manner of transmission and each cell makes a policy independently, scalability of the network will be greatly restricted.

SUMMARY

According to an embodiment there is provided a resource allocation method for a small cell cluster, the method allocating resources for a small cell cluster in a communications system, the communications system at least including base stations in the small cell cluster and a base station of an upper level serving for the small cell cluster, and the base stations of the small cell cluster including a base station taken as a cluster head, the SCC including at least one small cell and/or at least one SCC of a lower level, a coverage range of the SCC overlapping with a coverage range of at least one base station of the upper level, characterized in that the resource allocation method includes: exchanging by the base station of the upper level with another base station of the upper level, to obtain information on resources and/or interference of the other base station of the upper level; receiving information by the base station of the upper level at least from the cluster head of the SCC, to obtain information on resources and/or interference of the base station of the upper level; and allocating resources for the small cell cluster by the base station of the upper level based on the obtained information on resources and/or interference of the other base station of the upper level and the information on resources and/or interference of the base station of the upper level.

According to an embodiment, there is provided a resource allocation apparatus for a small cell cluster (SCC), configured in a base station, the apparatus allocating resources for a small cell cluster in a communications system, the communications system at least including base stations in the small cell cluster and a base station of an upper level serving for the small cell cluster, and the base stations of the small cell cluster including a base station taken as a cluster head, the SCC including at least one small cell and/or at least one SCC of a lower level, a coverage range of the SCC overlapping with a coverage range of at least one base station of the upper level, characterized in that the resource allocation apparatus includes: an exchanging unit configured to exchange with another base station of the upper level, to obtain information on resources and/or interference of the other base station of the upper level; a receiving unit configured to receive information at least from the cluster head of the SCC, to obtain information on resources and/or interference of the base station of the upper level; and an allocating unit configured to allocate resources for the small cell cluster based on the obtained information on resources and/or interference of the other base station of the upper level and information on resources and/or interference of the base station of the upper level.

According to an embodiment, there is provided a communications system, characterized in that the communications system at least includes: a cell of a base station of an upper level, the base station of the upper level allocating resources for one or more small cell clusters served by the base station of the upper level; and one or more small cell clusters, each of which including at least one small cell and/or at least one SCC of a lower level, the small cell cluster(s) communicating according to the resources allocated by the base station of the upper level; wherein, a coverage range of the SCC overlaps with a coverage range of at least one base station of the upper level.

An advantage of the embodiments of the present disclosure exists in that when the base station of an upper level allocates resources for the small cell cluster, not only resource allocation and/or interference of the base station of an upper level is taken into account, but also resource allocation and/or interference of the other base station of an upper level is taken into account. Hence, interference coordination may be performed efficiently on a small cell cluster at an edge of the base station of an upper level, thereby lowering interference to the small cell cluster. And furthermore, by allocating resources by the base station of an upper level for the small cell cluster, the resources may be allocated for the small cell cluster even though the number of the small cell cluster or the number of levels thereof is increased, thereby improving scalability of the network.

BRIEF DESCRIPTION OF THE DRAWINGS

For ease of understanding, embodiments will now be described with reference to the accompanying drawings in which.

DETAILED DESCRIPTION

Figure 1:
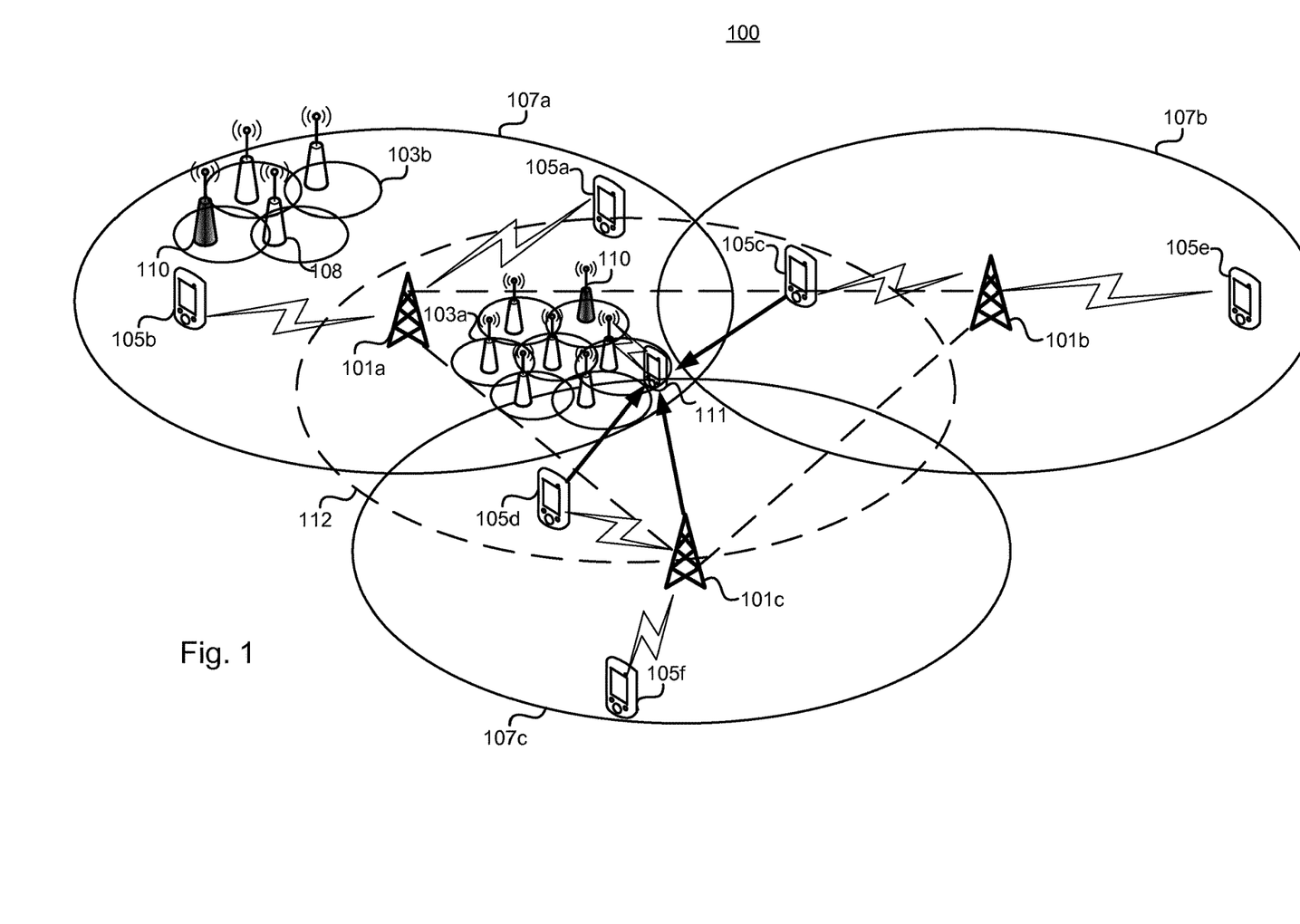
FIG. 1 is a schematic diagram of a scenario of an ultra-dense network in a first embodiment.

FIG. 1 is a schematic diagram of a communications system 100 including an Ultra-Dense Network (UDN) in the first embodiment.

The communications system 100 includes macro base stations 101 and base stations 108 arranged in a small cell cluster 103. The system operates in accordance with the Third Generation Project Partnership (3GPP) Long Term Evolution-Advanced (LTE-A) Protocols. LTE-A adopts OFDM and MIMO technologies, and is configured to operate using a Frequency Division Duplexing (FDD) mode or a Time Division Duplexing (TDD) mode transmission mode.

The communications system is arranged as a hierarchical system of levels, from top to bottom, macro base stations 101, small cell clusters 103 and small cells 108. In this embodiment there are three levels; the macro base stations 101 are described hereinafter as base stations of an upper level serving for the small cell cluster 103, and the base stations 108 of the small cell cluster 103, referred to as base stations of a lower level. The small cell cluster including a base station assigned as a cluster head 110 for managing performance aspects of the small cell cluster 103. For ease of explanation, three levels are described, however, a larger number of levels are also considered in a case where small cell clusters are further divided into groups of small cells sub-clusters.

In accordance with the first embodiment, the communications system includes: a cell of a base station of an upper level, the base station of the upper level allocating resources for one or more small cell clusters served by the base station of the upper level; and one or more small cell clusters, each of which including at least one small cell and/or at least one SCC of a lower level and one of the base stations of the small cell cluster being designated as a cluster head. The small cell cluster(s) communicating according to the resources allocated by the base station of the upper level; wherein, a coverage range of the SCC overlaps with a coverage range of at least one base station of the upper level.

In this embodiment, the base station of the upper level may allocate resources for one or more small cell clusters served by the base station of the upper level based on obtained information on resources and/or interference of another base station of the upper level and information on resources and/or interference of the base station of the upper level.

As shown in FIG. 1, in this scenario, macro cells 107a, 107b, 107c have macro base stations MBS1 101a, MBS2 101b and MBS3 101c, respectively, and macro base stations MBS1, MBS2 and MBS3 are adjacent to each other.

In a coverage range of macro cell 107a, there are small cell clusters SCC1 103a and SCC2 103b formed by multiple small cells, respectively, and user equipment MCU1 105a and MCU2 105b served by macro base station MBS1 101a.

In a coverage range of macro cell 107b, there are user equipment MCU3 105c and MCU5 105e served by macro base station MBS2 101b.

In a coverage range of macro cell 3, there exist user equipment MCU4 105d and MCU6 105f served by macro base station MBS3 101c.

As shown in FIG. 1, a range shown by dotted circle 112 is an interference range of small cell cluster SCC1 103a. Neighboring macro base station MBS3 101c and user equipment MCU1 105a, MCU3 105c and MCU4 105d are located in this range. In this embodiment, when user equipment 105 or base stations 101 are located in the interference range, if a used spectral resource is identical to that used by small cell cluster SCC1 103, interference may be produced between the user equipment 105 and the small cell cluster SCC1 103, or between the base stations 101 and small cell cluster SCC1 103.

In the scenario shown in FIG. 1, the main sources of interference to the UDN 100 are:
1. interference from communication of an uplink of the user equipment served by the macro base station 101. For example, in FIG. 1, if user equipment MCU1 105a, MCU3 105c and MCU4 105d use the same spectral resources as small cell cluster SCC1 103, the uplinks of user equipment MCU1 105a, MCU3 105c and MCU4 105d will produce interference to small cell cluster SCC1 103a. This is because user equipment MCU1 105a, MCU3 105c and MCU4 105d are relatively close to small cell cluster SCC1 103a, so are located in the interference range of small cell cluster SCC1 103. Since MCU2 105b, MCU5 105e and MCU6 105f in FIG. 1 are relatively far away, their uplinks will not produce interference to small cell cluster SCC1 103;
2. interference from communication of a downlink adjacent to the macro base station 101. For example, in FIG. 1, communication of a downlink macro base station MBS3 101c will produce interference to small cell cluster SCC1 103a;
3. interference from small cells within the small cell cluster 103. For example, interference will be produced between two or more small cells 108 in the same small cell cluster 103 using the same spectral resources; and
4. interference produced by a small cell cluster 103 to user equipment 105 served by the macro base station 101. For example, in FIG. 1, if user equipment MCU1 105a, MCU3 105c and MCU4 105d use the same resources as small cell cluster SCC1 103a, small cell cluster SCC1 103a will produce interference to the uplinks of user equipment MCU1 105a, MCU3 105c and MCU4 105d.

Figure 2:
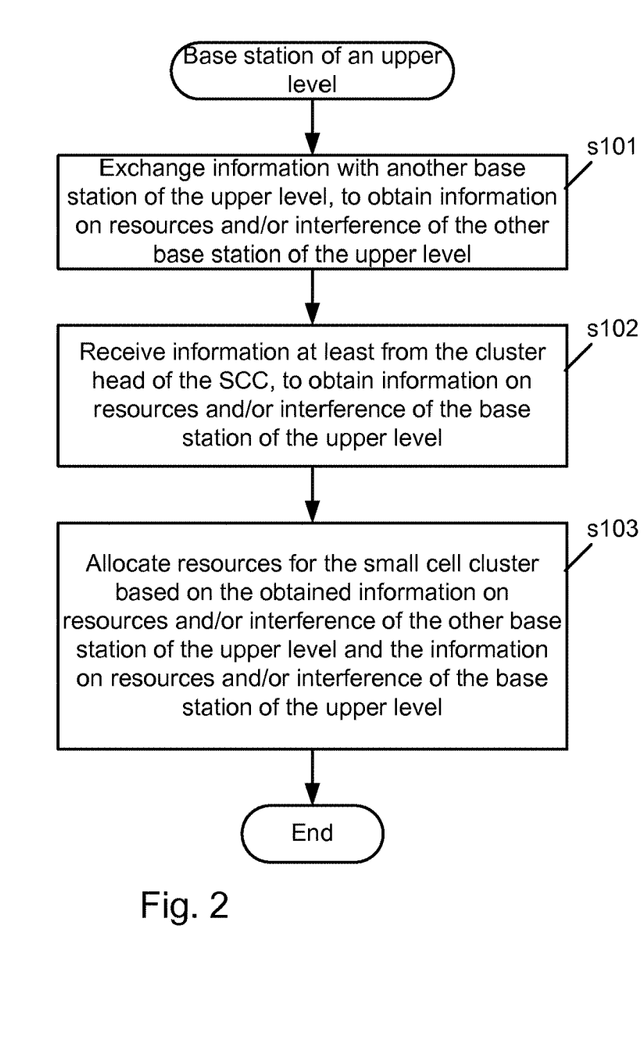
FIG. 2 is a flowchart of the resource allocation method in a first embodiment.

FIG. 2 is a flowchart of the resource allocation method of this embodiment. As shown in FIG. 2, the method includes, in [[step]] s101, a base station of an upper level exchanges information with another base station of the upper level, to obtain information on resources and/or interference of the other base station of the upper level.

In s102, the base station of the upper level receives information from at least the cluster head of the SCC, to obtain information on resources and/or interference of the base station of the upper level.

In s103, the base station of the upper level allocates resources for the small cell cluster based on the obtained information on resources and/or interference of the other base station of the upper level and the information on resources and/or interference of the base station of the upper level.

According to this embodiment, resources are allocated by the base station of the upper level, based on both: the allocated resources and interference experienced by the base station of the upper level carrying out the resource allocation method; and the allocation resources and interference experienced by other base stations of the upper level.

Hence, interference coordination may be efficiently performed on a small cell cluster at an edge of the base station of the upper level, thereby lowering the interference to the small cell cluster. Furthermore, by allocating the resources by the base station of the upper level for the small cell cluster, the resources may be allocated for the small cell cluster by using the method even though the number or levels of the small cell cluster is/are increased, thereby improving scalability of the network.

In s101 and s102, the macro base station 101 may receive feedback information on user equipment 105, base stations 108, and cluster heads 110 of small cell clusters served by it, so as to obtain information on resources and interference at the macro base station. The macro base station may exchange information with other neighboring macro base stations. The exchange may be performed via an X2 interface, and may also be performed via other paths. For example, macro base station MBS1 in FIG. 1 may exchange with neighboring macro base stations MBS2 and MBS3 via an X2 interface, so as to respectively obtain information on resources and/or interference of the macro base stations MBS2 and MBS3.

In this embodiment, the information on resources and/or interference of the other macro base station include position/location information, interference information and/or usage information, etc., on the other macro base station and user equipment served by it. For example, when the other macro base station is MBS2 101$b$, the information on resources and/or interference may be position information, interference information and/or usage information, etc., on MBS2 101$b$ and user equipment MCU3 105$c$ and MCU5 105$e$ served by it, wherein the position information on macro base station MBS2 101$b$ may be informed to macro base station MBS1 101$a$ only once, and other information may be repeatedly transmitted to MBS1 101$a$ in a predetermined period.

The position information, interference information and/or usage information, etc., on the user equipment served by the other macro base station may be acquired by the other macro base station by collecting information reported by the user equipment. For example, macro base station MBS2 may collect RSRP measurement reports, GPS information and/or CQI reports from user equipment MCU3 and MCU5, so as to obtain information on user equipment.

The information on resources and/or interference of the other macro base station may further include a high interference indicator (HII), an overload indicator (OI) and/or load information, etc., and these information may more accurately reflect the resource usage and/or interference of the other macro base station.

In s103, the macro base station allocates resources for the small cell cluster according to the resource allocation and/or interference of the macro base station and the resource allocation and/or interference of the other macro base station. For example, regardless of the user equipment served by the macro base station or served by the other macro base station, when the small cell cluster is adjacent to the user equipment, both of them may be allocated with orthogonal resources, so as to avoid mutual interference. When the small cell cluster and the user equipment are relatively far away from each other, both of them may reuse spectral resources, so as to improve utilization of the spectral resources.

Figure 3:
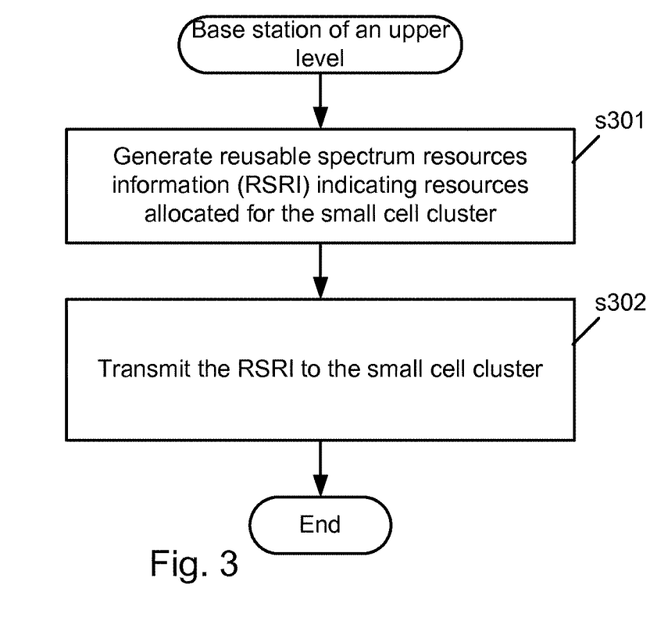
FIG. 3 is a flowchart of a method for allocating resources for a small cell cluster by a macro base station based on acquired information.

FIG. 3 is a flowchart showing the processing of s103 of FIG. 2 in more detail.

In s301, the base station of the upper level generates reusable spectrum resources information (RSRI) indicating resources allocated for the small cell cluster based on the information on resources and/or interference of the other base station of the upper level and the information on resources and/or interference of the base station of the upper level.

In s302: the base station of the upper level transmits the reusable spectrum resources information to the small cell cluster.

In this embodiment, the information on resources and/or interference of the macro base station may include position information, interference information and/or usage information, etc., on the macro base station and user equipment and small cell clusters served by the macro base station. Furthermore, the information on resources and/or interference of the macro base station may include information on operator policies, and scheduling information, etc.

In s301, the macro base station allocates corresponding resources for the user equipment and any small cell cluster served by it based on the information on resources and/or interference of the other macro base station and the information on resources and/or interference of the macro base station, and generates the reusable spectrum resources information (RSRI) according to a result of the resource allocation. The reusable spectrum resources information (RSRI) indicates spectral resources allocated for the small cell cluster, and may have forms shown in Table 1 below:

TABLE 1

| Band | MBS1 | MBS2 | MBS3 | SCC1 |
|---|---|---|---|---|
| Band 1 | MCU1 | | | X |
| Band 2 | MCU2 | | | ✓ |
| Band 3 | | MCU3 | | X |
| Band 4 | | MCU5 | MCU4 | X |
| Band 5 | | | MCU6 | ✓ |
| Band 6 | | | | ✓ |

As shown in Table 1, the available spectral resources of macro cells 107$a$, 107$b$ and 107$c$ in FIG. 1 are divided into six bands, Band 1-Band 6, which are orthogonal to each other, and macro base stations MBS1 101$a$, MBS2 101$b$ and MBS3 101$c$ allocate spectral resources at corresponding bands for the user equipment served by them respectively. User equipment MCU4 105$d$ and MCU5 105$e$ which are relatively far away from each other may reuse spectral resources at the same Band4, thereby improving efficiency of utilization of the spectral resources.

In Table 1, in a band to which small cell cluster SCC1 corresponds, "x" denotes a band that is not allocated to the small cell cluster, and "✓" denotes a band that is allocated to the small cell cluster. As shown in Table 1, the small cell cluster and a user terminal relatively close to it may not reuse spectral resources at the same band, and the small cell cluster and a user terminal that is relatively far away from it may reuse spectral resources at the same band. For example, user terminals MCU1 105*a*, MCU3 105*c* and MCU4 105*d* in FIG. 1 are located in the interference range 4 of SCC1 103*a*, and user terminals MCU2 105*b*, MCU5 105*e* and MCU6 105*f* are located out of the interference range 4 of SCC1 103*a*, that is, user terminals MCU1 105*a*, MCU3 105*c* and MCU4 105*d* are relatively close to SCC1 103*a*, and user terminals MCU2 105*d*, MCU5 105*e* and MCU6 105*f* are relatively far away from SCC1 101*a*.

Hence, Band 1, Band 3 and Band 4 allocated for user terminals MCU1 105*a*, MCU3 105*c* and MCU4 105*d* are not allocated for small cell cluster SCC1 103*a*, thereby avoiding interference, and Band 2 and Band 5 allocated for user terminals MCU2 105*b* and MCU6 105*f* may be allocated for small cell cluster SCC1 103*a*, thereby improving efficiency of utilization of the spectral resources. Furthermore, Band 6 is not used by any user terminal, hence, it may be allocated for small cell cluster SCC1 103*a*.

In Table 1, the result of resource allocation for small cell cluster SCC1 is shown, and a result of resource allocation for small cell cluster SCC2 may also be shown. Results of resource allocation for the small cell clusters may correspond to IDs of the small cell clusters for being shown.

It should be noted that Table 1 only shows one form of the reusable spectrum resources information (RSRI). However, this embodiment is not limited thereto, and the reusable spectrum resources information (RSRI) may have other forms.

In s302, the macro base station transmits the reusable spectrum resources information (RSRI) to the small cell cluster, the reusable spectrum resources information (RSRI) indicating which spectral resources are used by the small cell cluster for communication. The macro base station may transmit the reusable spectrum resources information (RSRI) to a small base station taken as a cluster head in the small cell cluster, and the cluster head may extract information on the resources allocated for the small cell cluster from the reusable spectrum resources information (RSRI) according to the ID of the small cell cluster.

The macro base station may perform bilateral communication with the cluster head of the small cell cluster. For example, the macro base station may transmit the reusable spectrum resources information (RSRI) to the cluster head of the small cell cluster, and the cluster head of the small cell cluster may report spectral configuration information and other information to the macro base station.

The macro base station may communicate with the cluster head of the small cell cluster via an X2 interface. In this embodiment, 101 and 102 may be executed repeatedly, that is, the macro base station may execute 101, so as to acquire the information on resources and/or interference of the neighboring other macro base station. Then, the macro base station may execute s102, so as to allocate resources for the small cell cluster based on the obtained information on resources and/or interference of the other macro base station and the information on resources and/or interference of the macro base station. And after a predetermined period of time or when a predetermined event occurs, the macro base station may execute s101 again, so as to re-acquire the information on resources and/or interference of the neighboring other macro base station, and then may execute s102 again, so as to allocate resources for the small cell cluster and the user equipment based on the re-acquired information of the neighboring other macro base station and the information of the macro base station.

It can be seen that in this embodiment, the exchange in s101 may be proactive, that is, which resources may be used may be determined according to the information acquired by exchange in s101, and the resources are allocated in s103. Furthermore, the exchange in s101 may be reactive, that is, a level of being interfered of used resources may be judged according to the information acquired by exchange in s101, and the used resources are allocated in s103.

Figure 4:
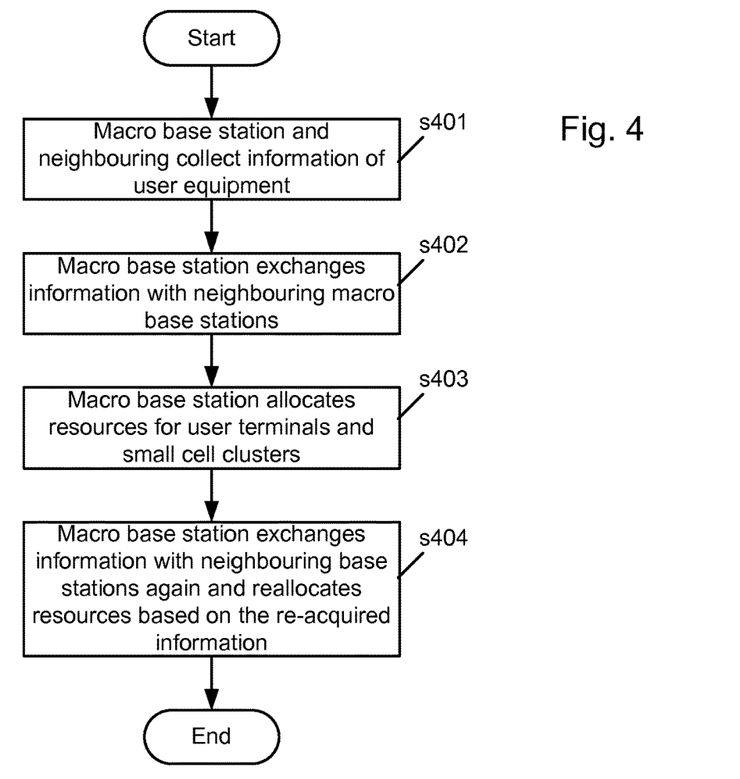
FIG. 4 is a flowchart of the processing of the macro base stations.

FIG. 4 is a flowchart of an example of the processing by the macro base stations in the first embodiment.

In s401, macro base stations MBS2 101*b* and MBS3 101*c* neighboring macro base station MBS1 101*a* collect information of user equipment MCU3-MCU6 105*c* to 105*f*. For example, macro base stations MBS2 and MBS3 may acquire position information and interference information of each piece of user equipment according to RSRP detection reports and GPS information transmitted by user equipment MCU3-MCU6 and/or interference information from CQI reports. Furthermore macro base station MBS1 101*a* may collect information on user equipment MCU1 105*a* and MCU2 105*b* and small cell clusters SCC1 103*a* and SCC2 103*b* served by it. The information on small cell clusters SCC1 103*a* and SCC2 103*b* may be fed back to macro base station MBS1 by respective cluster heads 110 of small cell clusters SCC1 and SCC2;

In s402 macro base station MBS1 exchanges information with neighboring macro base stations MBS2 101*b* and MBS3 101*c*, to obtain the information collected by macro base stations MBS2 and MBS3 and information on macro base stations MBS2 and MBS3 themselves. In this way, macro base station MBS1 obtains the information on resources and/or interference of the neighboring macro base stations and the neighboring user equipment, such as the position information, interference information and/or usage information of MBS2 and MBS3 and MCU3 and MCU4. At the same time, macro base stations MBS2 and MBS3 also obtain information on other neighboring macro base stations. Furthermore, macro base station MBS1 also acquires the information on resources and/or interference of itself, such as the position information, interference information and/or usage information of MBS1, MCU1, SCC1 and SCC2.

In [[step]] s403 macro base station MBS1 allocates resources for user terminals MCU1 and MCU2 and small cell clusters SCC1 and SCC2 according to the information on resources and/or interference acquired from neighboring macro base stations MBS2 and MBS3 and the information on resources and/or interference of macro base station MBS1. Furthermore, macro base stations MBS2 and MBS3 may also allocate resources for user equipment MCU3, MCU4, MCU5 and MCU6 respectively served by them. In s403, macro base station MBS1 generates the reusable spectrum resources information (RSRI) shown in Table 1, and transmit the reusable spectrum resources information (RSRI) to the cluster heads of small cell clusters SCC1 and SCC2, for indicating the resources allocated for the small cell clusters.

In s404 macro base station MBS1 exchanges with neighboring macro base stations MBS2 and MBS3 again after macro base stations MBS1, MBS2 and MBS3 allocate the resources, to obtain such information as the high interference indicator (HII), the overload indicator (OI) and/or the load information, etc., of macro base stations MBS2 and MBS3, and macro base station MBS1 may reallocate resources for the small cell clusters and user equipment based on these re-acquired information.

In this embodiment, when the base station of an upper level allocates resources for the small cell cluster, the allocation is based on not only resource allocation and/or interference of the base station of an upper level but also resource allocation and/or interference of the other base station of an upper level. Hence, interference coordination may be performed efficiently on a small cell cluster at an edge of the base station of an upper level, thereby lowering interference to the small cell cluster. And furthermore, by allocating resources by the base station of an upper level for the small cell cluster, the resources may be allocated for the small cell cluster even though the number of the small cell cluster or the number of levels thereof is increased, thereby improving scalability of the network.

Figure 5:
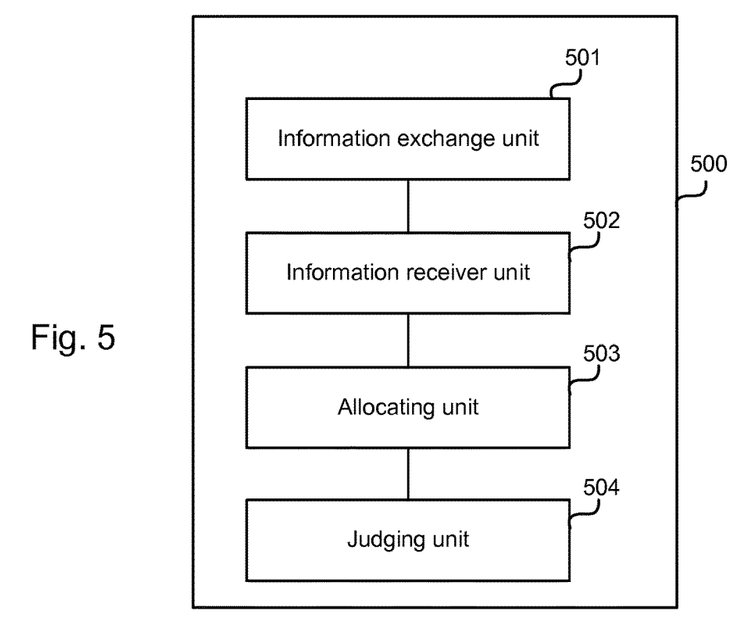
FIG. 5 is a schematic diagram of the resource allocation apparatus.

FIG. 5 is a schematic diagram of the resource allocation apparatus forming part of a base station in the first embodiment. The resource allocation apparatus 500 includes an exchanging unit 501, a receiving unit 502, an allocating unit 503 and a judging unit 504.

The exchanging unit 501 is configured to exchange information with another base station of the upper level, to obtain information on resources and/or interference of the other base station of the upper level. The receiving unit 502 is configured to receive information at least from the cluster head of the SCC, to obtain information on resources and/or interference of the base station of the upper level, and the allocating unit 503 is configured to allocate resources for the small cell cluster based on the obtained information on resources and/or interference of the other base station of the upper level and information on resources and/or interference of the base station of the upper level.

The judging unit 504 is configured to judge a level of interference to a used resource based on the obtained information on resources and/or interference of the other base station of the upper level and the information on resources and/or interference of the base station of the upper level.

Figure 6:
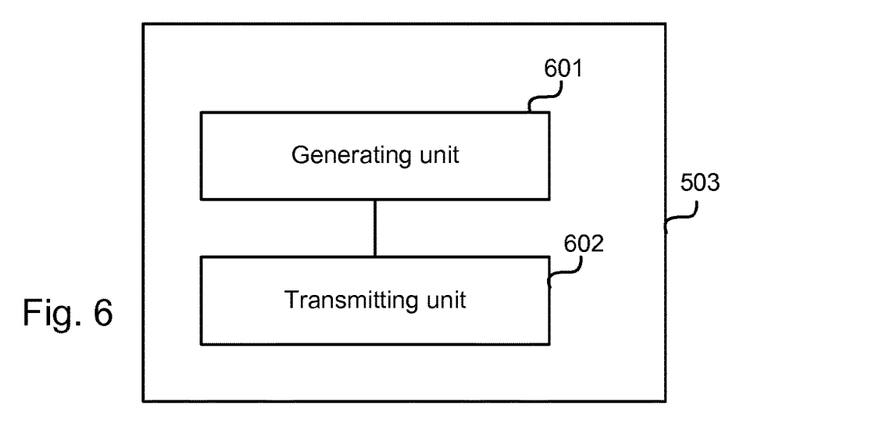
FIG. 6 is a schematic diagram of an allocating unit.

FIG. 6 is a schematic diagram of the allocating unit 503. As shown in FIG. 6, the allocating unit 503 includes a generating unit 601 and a transmitting unit 602.

In this embodiment, the generating unit 601 is configured to generate reusable spectrum resources information (RSRI) indicating resources allocated for the small cell cluster based on the information of the other base station of the upper level on resources and/or interference and information of the base station of the upper level on resources and/or interference, and the transmitting unit 602 is configured to transmit the reusable spectrum resources information to the small cell cluster. For example, the transmitting unit 602 transmits the reusable spectrum resources information (RSRI) to a small base station taken as a cluster head in the small cell cluster.

Figure 7:
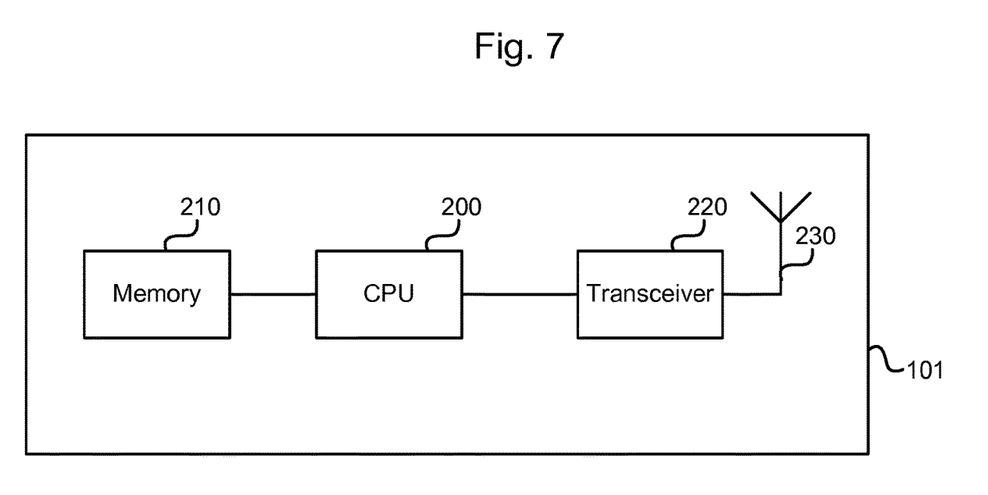
FIG. 7 is a schematic diagram of the base station.

FIG. 7 is a schematic diagram of the base station of an upper level 101. As shown in FIG. 7, the base station 101 may include a central processing unit (CPU) 200 and a memory 210, the memory 210 being coupled to the central processing unit 200. The memory 210 may store various data, and furthermore, it may store a program for information processing, and execute the program under control of the central processing unit 200.

For example, the central processing unit 200 may be configured to perform the following control: making the base station 101 taken as a base station of an upper level to obtain information on resources and/or interference of the base station 101, and making the base station 101 exchange information with another base station of the upper level, to obtain information on resources and/or interference of the other base station of the upper level; and making the base station 700 allocate resources for the small cell cluster based on the obtained information on resources and/or interference of the other base station of the upper level and the information on resources and/or interference of the base station 101.

Furthermore, as shown in FIG. 7, the base station 700 may include a transceiver 220, and an antenna 230, etc.; wherein, functions of the above components are conventional and shall not be described herein any further. It should be noted that the base station 101 does not necessarily include all the parts shown in FIG. 7, and furthermore, the base station 101 may include parts not shown in FIG. 7.

The methods may be stored as instructions in a computer-readable program, wherein when the program is executed in a resource allocation apparatus for a small cell cluster or a base station, the program enables the resource allocation apparatus for a small cell cluster or the base station to carry out the resource allocation method for a small cell cluster as described in the embodiment.

The embodiments also provide a storage medium in which a computer-readable program is stored, wherein the computer-readable program enables a resource allocation apparatus for a small cell cluster or a base station to carry out the resource allocation method for a small cell cluster as described in the embodiments.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The method/apparatus described with reference to the embodiments of the present invention may be directly embodied as hardware, a software module executed by a processor, or a combination thereof. For example, one or more of the block diagrams and/or one or more combinations of the block diagrams shown in FIGS. 5 and 6 (such as the information exchanging unit, the information receiving unit, the cluster determining unit, and the information transmitting unit, etc.) may correspond to soft modules of a process of a computer program, and may also correspond to hardware modules.

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 5-6 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to principles of the present disclosure, and such variants and modifications fall within the scope of the present invention.

Alternatives and Modifications

In embodiments a three level system architecture was described.

In a modification, the communications system described may have a structure of multiple levels, that is, the structure of the communications system formed by the base stations and small cell clusters of an upper level may be scaled level by level, and in each level, manners of allocating resources by the base stations of an upper level for the small cell clusters may be similar, and manners of allocating resources between the base stations in the small cell clusters may also be similar.

In particular small cell clusters can be further divided into small cell clusters. Therefore a base station of an upper level may be a macro base station, or a small cell cluster higher in the hierarchy.

Each small cell cluster may include at least one small cell and/or at least one small cell cluster of a lower level, that is, a member of each small cell cluster may be a small cell, and may also be a small cell cluster of a lower level, and the cluster head of the small cell cluster may allocate resources for the at least one small cell and/or the at least one small cell cluster within the small cell cluster. It should be noted that in a case where the cluster head of the small cell cluster allocates resources for the at least one small cell cluster of a lower level within the small cell cluster, the cluster head of the small cell cluster becomes a base station of an upper level of the small cell cluster of a lower level.

The number of the resources allocated by the cluster head for the small cell cluster of the lower level may be less than or equal to the number of the resources allocated by the base station of the upper level for the small cell cluster, and a granularity of the resources allocated by the cluster head for the small cell cluster of the lower level may be finer than or equal to a granularity of the resources allocated by the base station of the upper level for the small cell cluster. The granularity of the resources may reflect a refining level of dividing the resources. For example, a finer granularity of the resources reflects a higher refining level of dividing the resources. Hence, although the number of the resources allocated in a lower level may be smaller, a granularity of allocated resources may be finer, thereby improving efficiency of utilization of resources.

In the embodiments, the cluster head of the small cell cluster allocates resources for the small cells in the small cell cluster. The small cell cluster may have one or more small cell clusters of a lower level. In a modification the cluster head of the small cell cluster may allocate resources for the small cell clusters of a lower level, that is, the macro base station allocates resources for the small cell cluster of a highest level, and each level of small cell cluster allocates resources for the small cells and the small cell clusters of a lower level covered by it. By allocating resources in this way, the scalability of the network may further be improved.

In this embodiment, the coverage range of the small cell cluster may overlap with the coverage range of at least one base station of an upper level. For example, the coverage range of the small cell cluster may be totally or partially covered by a coverage range of a base station of an upper level, or the coverage range of the small cell cluster may totally or partially overlap with coverage ranges of at least two base stations. Furthermore, in this embodiment, at least part of the small cells and/or the small cell cluster of a lower level in the small cell cluster may be located in areas covered by different base stations of an upper level, in which scenario the resource allocation method may allocate resources for the small cell cluster more efficiently.

In the embodiments, the communications system operates using LTE-A protocols. In an alternative, other cellular network protocols such as Long Term Evolution and 5G are used.

In the embodiment, s102 follows s101. The order of executing s101 and s102 is not specially limited, in an alternative, s102 may be executed first or s101 and s102 are executed at the same time; or s101 and s102 are executed cyclically and alternatively.

In the embodiment, the macro base station may communicate with the cluster head of the small cell cluster via an X2 interface. Communication may be performed via other channels and in an alternative, the communication may be performed by transmitting broadcast/multicast message(s).

For implementations of the present disclosure containing the above embodiments, following supplements are further disclosed.

Supplement 1. A resource allocation method for a small cell cluster (SCC), the method allocating resources for a small cell cluster in a communications system, the communications system at least including base stations in the small cell cluster and a base station of an upper level serving for the small cell cluster, and the base stations of the small cell cluster including a base station taken as a cluster head, the SCC including at least one small cell and/or at least one SCC of a lower level, a coverage range of the SCC overlapping with a coverage range of at least one base station of the upper level, characterized in that the resource allocation method includes: exchanging by the base station of the upper level with another base station of the upper level, to obtain information on resources and/or interference of the other base station of the upper level; receiving information by the base station of the upper level at least from the cluster head of the SCC, to obtain information on resources and/or interference of the base station of the upper level; and allocating resources for the small cell cluster by the base station of the upper level based on the obtained information on resources and/or interference of the other base station of the upper level and the information on resources and/or interference of the base station of the upper level.

Supplement 2. The resource allocation method according to supplement 1, characterized in that the allocating resources for the small cell cluster by the base station of the upper level based on the obtained information on resources and/or interference of the other base station of the upper level and the information on resources and/or interference of the base station of the upper level includes: generating reusable spectrum resources information (RSRI) indicating resources allocated for the small cell cluster by the base station of the upper level based on the information on resources and/or interference of the other base station of the upper level and the information on resources and/or interference of the base station of the upper level; and transmitting the reusable spectrum resources information by the base station of the upper level to the small cell cluster.

Supplement 3. The resource allocation method according to supplement 2, characterized in that, the base station of the upper level transmits the reusable spectrum resources information (RSRI) to a base station taken as a cluster head in the small cell cluster.

Supplement 4. The resource allocation method according to supplement 1, characterized in that, the information on resources and/or interference of the other base station of the upper level includes: position information, interference information and/or usage information on the other base station of the upper level and user equipment served by the other base station of the upper level.

Supplement 5. The resource allocation method according to supplement 4, characterized in that, the cluster head of the small cell cluster allocates resources for at least one small cell cluster of the lower level in the SCC; the number of the resources allocated by the cluster head for the small cell cluster of the lower level is less than or equal to the number of the resources allocated by the base station of the upper level for the small cell cluster, and a granularity of the resources allocated by the cluster head for the small cell cluster of the lower level is finer than or equal to a granularity of the resources allocated by the base station of the upper level for the small cell cluster.

Supplement 6. The resource allocation method according to supplement 1, characterized in that, the information on resources and/or interference of the base station of the upper level includes: position information, interference information and/or usage information on the base station of the upper level and user equipment and the small cell cluster served by the base station of the upper level.

Supplement 7. The resource allocation method according to supplement 1, characterized in that, the base station of the upper level further allocates resources for the user equipment served by it based on the obtained information on resources and/or interference of the other base station of the upper level and the information on resources and/or interference of the base station of the upper level.

Supplement 8. The resource allocation method according to supplement 1, characterized in that, the base station of the upper level further judges a level of being interfered of a used resource based on the obtained information on resources and/or interference of the other base station of the upper level and the information on resources and/or interference of the base station of the upper level.

Supplement 9. A resource allocation apparatus for a small cell cluster (SCC), configured in a base station, the apparatus allocating resources for a small cell cluster in a communications system, the communications system at least including base stations in the small cell cluster and a base station of an upper level serving for the small cell cluster, and the base stations of the small cell cluster including a base station taken as a cluster head, the SCC including at least one small cell and/or at least one SCC of a lower level, a coverage range of the SCC overlapping with a coverage range of at least one base station of the upper level, characterized in that the resource allocation apparatus includes: an exchanging unit configured to exchange with another base station of the upper level, to obtain information on resources and/or interference of the other base station of the upper level; a receiving unit configured to receive information at least from the cluster head of the SCC, to obtain information on resources and/or interference of the base station of the upper level; and an allocating unit configured to allocate resources for the small cell cluster based on the obtained information on resources and/or interference of the other base station of the upper level and information on resources and/or interference of the base station of the upper level.

Supplement 10. The resource allocation apparatus according to supplement 9, characterized in that the allocating unit includes: a generating unit configured to generate reusable spectrum resources information (RSRI) indicating resources allocated for the small cell cluster based on the information of the other base station of the upper level on resources and/or interference and information of the base station of the upper level on resources and/or interference; and a transmitting unit configured to transmit the reusable spectrum resources information to the small cell cluster.

Supplement 11. The resource allocation apparatus according to supplement 10, characterized in that, the transmitting unit transmits the reusable spectrum resources information (RSRI) to a small base station taken as a cluster head in the small cell cluster.

Supplement 12. The resource allocation apparatus according to supplement 9, characterized in that, the information on resources and/or interference of the other base station of the upper level includes: position information, interference information and/or usage information on the other base station of the upper level and user equipment served by the other base station of the upper level.

Supplement 13. The resource allocation apparatus according to supplement 9, characterized in that, the information on resources and/or interference of the base station of the upper level includes: position information, interference information and/or usage information on the base station of the upper level and user equipment and the small cell cluster served by the base station of the upper level.

Supplement 14. The resource allocation apparatus according to supplement 9, characterized in that, the allocating unit further allocates resources for user equipment served by the base station of the upper level based on the obtained information on resources and/or interference of the other base station of the upper level and the information on resources and/or interference of the base station of the upper level.

Supplement 15. The resource allocation apparatus according to supplement 9, characterized in that the resource allocation apparatus further includes: a judging unit configured to judge a level of being interfered of a used resource based on the obtained information on resources and/or interference of the other base station of the upper level and the information on resources and/or interference of the base station of the upper level.

Supplement 16. A communications system, characterized in that the communications system at least includes: a cell of a base station of an upper level, the base station of the upper level allocating resources for one or more small cell clusters served by the base station of the upper level; and one or more small cell clusters, each of which including at least one small cell and/or at least one SCC of a lower level, the small cell cluster(s) communicating according to the resources allocated by the base station of the upper level; wherein, a coverage range of the SCC overlaps with a coverage range of at least one base station of the upper level.

Supplement 17. The communications system according to supplement 16, characterized in that, each of the small cell clusters has a base station taken as a cluster head, the cluster head communicating with the base station of the upper level, and allocating resources for at least one small cell and/or at least one SCC of the lower level in the small cell cluster.

The invention claimed is:

1. A resource allocation method for a small cell cluster (SCC), the method allocating resources for the SCC in a communications system, the communications system having at least two base stations in the SCC and a first base station of an upper level serving the SCC, and the base stations of the SCC including a base station taken as a cluster head, the SCC comprising at least one small cell or at least one SCC of a lower level, and a coverage range of the SCC overlapping with a coverage range of at least one base station of the upper level, wherein the resource allocation method comprises:

exchanging a communication between the first base station of the upper level and a second base station of the upper level, so as to obtain information on at least one of resources or interference of the second base station of the upper level;

receiving, at the first base station of the upper level from at least the cluster head of the SCC, information associated with at least one of resources or interference of the first base station of the upper level; and allocating resources for the SCC by the first base station of the upper level based on the information on at least one of resources or interference of the second base station of the upper level and the information on at least one of resources or interference of the first base station of the upper level, wherein:

the cluster head of the SCC allocates resources for at least one SCC of the lower level in the SCC;

a number of the resources allocated by the cluster head for the SCC of the lower level is less than or equal to the number of the resources allocated by first base station of the upper level for the SCC; and a refining level of division of the resources allocated by the cluster head for the SCC of the lower level is finer than or equal to a refining level of division of the resources allocated by the first base station of the upper level for the SCC.

2. The resource allocation method according to claim 1, wherein the allocating resources for the SCC by the first base station of the upper level based on the information on at least one of resources or interference of the second base station of the upper level and the information on at least one of resources or interference of the first base station of the upper level comprises:

generating reusable spectrum resources information (RSRI) indicating resources allocated for the SCC by the first base station of the upper level based on the information on at least one of resources or interference of the second base station of the upper level and the information on at least one of resources or interference of the first base station of the upper level; and transmitting the RSRI by the first base station of the upper level to the SCC.

3. The resource allocation method according to claim 2, wherein the first base station of the upper level transmits the RSRI to the base station taken as the cluster head of the SCC.

4. The resource allocation method according to claim 1, wherein the information on at least one of resources or interference of the second base station of the upper level comprises at least one of:

geographical position information;
interference information; or usage information on the second base station of the upper level and user equipment served by the second base station of the upper level.

5. The resource allocation method according to claim 1, wherein the information on at least one of resources or interference of the first base station of the upper level comprises at least one of:

geographic position information;
interference information; or
usage information on the first base station of the upper level and user equipment in the SCC served by the first base station of the upper level.

6. The resource allocation method according to claim 5, wherein the first base station of the upper level further allocates resources for the user equipment served by the first base station of the upper level based on the information on at least one of resources or interference of the second base station of the upper level and the information on at least one of resources or interference of the first base station of the upper level.

7. The resource allocation method according to claim 1, wherein the first base station of the upper level further judges a level of being interfered of a used resource based on the information on at least one of resources or interference of the second base station of the upper level and the information on at least one of resources or interference of the first base station of the upper level.

8. A resource allocation apparatus for a small cell cluster (SCC), configured in a base station, the apparatus allocating resources for an SCC in a communications system, the communications system at least comprising base stations in the SCC and a first base station of an upper level serving for the SCC, and the base stations of the SCC including a base station taken as a cluster head, the SCC comprising at least one small cell or at least one SCC of a lower level, a coverage range of the SCC overlapping with a coverage range of at least one base station of the upper level, wherein the resource allocation apparatus comprises:

an exchanging unit configured to exchange with a second base station of the upper level, to obtain information on at least one of resources or interference of the second base station of the upper level;

a receiving unit configured to receive information at least from the cluster head of the SCC, to obtain information on at least one of resources or interference of the first base station of the upper level; and an allocating unit configured to allocate resources for the SCC based on the information on at least one of resources or interference of the second base station of the upper level and information on at least one of resources or interference of the first base station of the upper level, wherein:

the cluster head of the SCC allocates resources for at least one SCC of the lower level in the SCC;

a number of the resources allocated by the cluster head for the SCC of the lower level is less than or equal to the number of the resources allocated by first base station of the upper level for the SCC; and a refining level of division of the resources allocated by the cluster head for the SCC of the lower level is finer than or equal to a refining level of division of the resources allocated by the first base station of the upper level for the SCC.

9. The resource allocation apparatus according to claim 8, wherein the allocating unit comprises:

a generating unit configured to generate reusable spectrum resources information (RSRI) indicating resources allocated for the SCC based on the information of the second base station of the upper level on at least one of resources or interference and information of the first base station of the upper level on at least one of resources or interference; and a transmitting unit configured to transmit the RSRI to the SCC.

10. The resource allocation apparatus according to claim 9, wherein the transmitting unit transmits the RSRI to the base station taken as the cluster head in the SCC.

11. The resource allocation apparatus according to claim 8, wherein the allocating unit further allocates resources for user equipment served by the first base station of the upper level based on the information on at least one of resources or interference of the second base station of the upper level and the information on at least one of resources or interference of the first base station of the upper level.

12. The resource allocation apparatus according to claim 8, wherein the resource allocation apparatus further comprises:

a judging unit configured to judge a level of being interfered of a used resource based on the information on at least one of resources or interference of the second base station of the upper level and the information on at least one of resources or interference of the first base station of the upper level.

* * * * *